US009576068B2

(12) United States Patent
Reesman et al.

(10) Patent No.: US 9,576,068 B2
(45) Date of Patent: Feb. 21, 2017

(54) DISPLAYING SELECTED PORTIONS OF DATA SETS ON DISPLAY DEVICES

(75) Inventors: Benjamin Charles Reesman, San Francisco, CA (US); Christopher Mark Downey, Carlsbad, CA (US); Matthew John DiMeo, La Jolla, CA (US)

(73) Assignee: Good Technology Holdings Limited, Waterloo, Ontario (CA)

( * ) Notice: Subject to any disclaimer, the term of this patent is extended or adjusted under 35 U.S.C. 154(b) by 710 days.

(21) Appl. No.: 12/912,571

(22) Filed: Oct. 26, 2010

(65) Prior Publication Data

US 2012/0102392 A1   Apr. 26, 2012

(51) Int. Cl.
G06F 17/00    (2006.01)
G06F 17/30    (2006.01)

(52) U.S. Cl.
CPC ............... G06F 17/30905 (2013.01)

(58) Field of Classification Search
CPC .............................................. G06F 17/30905
USPC ....................................................... 715/243
See application file for complete search history.

(56) References Cited

U.S. PATENT DOCUMENTS

| | | | | |
|---|---|---|---|---|
| 5,469,539 | A * | 11/1995 | Usuda | G06F 8/10 345/440 |
| 2005/0071755 | A1* | 3/2005 | Harrington | G06F 17/2288 715/229 |
| 2007/0074108 | A1* | 3/2007 | Xie | G06F 17/2229 715/234 |
| 2007/0250497 | A1* | 10/2007 | Mansfield | G06F 17/30731 |
| 2008/0046816 | A1* | 2/2008 | Cao et al. | 715/518 |
| 2008/0134101 | A1* | 6/2008 | Newman | G06F 3/03545 715/856 |
| 2008/0148144 | A1* | 6/2008 | Tatsumi | 715/235 |

(Continued)

FOREIGN PATENT DOCUMENTS

| | | |
|---|---|---|
| CN | 101657813 A | 2/2010 |
| WO | 2009072436 A1 | 6/2009 |

OTHER PUBLICATIONS

Mikko Pohja and Petri Vuorimaa. 2005. CSS Layout Engine for Compound Documents. In Proceedings of the Third Latin American Web Congress (LA-WEB '05). IEEE Computer Society, Washington, DC, USA, 148-156.*

(Continued)

Primary Examiner — Laurie Ries
(74) Attorney, Agent, or Firm — Fish & Richardson P.C.

(57) ABSTRACT

Embodiments of the invention are concerned with displaying a data set within a display area of a display device, where the data set includes a plurality of groups of elements, each of the groups including a higher-level element and one or more lower-level elements. Each element may for example form part of a Document Object Model for an HTML document.

Elements are processed to identify and render one or more elements in the display area. An element is identified if the region it occupies corresponds with a selected portion of a layout area of the data set. Groups of elements are processed differently in dependence on whether a higher-level element of a group has a pre-defined spatial relationship with respect to one or more lower-level elements in the group, allowing the invention to efficiently process elements which are members of groups for which the pre-defined spatial relationship has been identified.

24 Claims, 9 Drawing Sheets

(56) References Cited

U.S. PATENT DOCUMENTS

| | | | |
|---|---|---|---|
| 2008/0148147 A1* | 6/2008 | Poston | G06F 17/30716 715/273 |
| 2009/0070413 A1* | 3/2009 | Priyadarshan et al. | 709/203 |
| 2009/0182837 A1* | 7/2009 | Rogers | 709/215 |
| 2009/0307618 A1* | 12/2009 | Lawler | G06F 3/0481 715/764 |
| 2010/0174732 A1* | 7/2010 | Levy | G06F 17/211 707/768 |
| 2010/0274536 A1* | 10/2010 | Okada | G05B 19/41885 703/1 |
| 2010/0281064 A1* | 11/2010 | Ikegami | 707/797 |
| 2011/0289393 A1* | 11/2011 | Choi | 715/205 |
| 2012/0096389 A1* | 4/2012 | Flam et al. | 715/777 |

OTHER PUBLICATIONS

Bert Bos et al (editor), "Cascading Style Sheets, level 2 CSS2 Specification", World Wide Web Consortium (W3C), Apr. 11, 2008, Web, p. 13—paragraph 17.5.3, http://www.w3.org/TR/2008/REC-CSS2-20080411/css2.

Dave Hyatt, "WebCore Rendering I—The Basics", Surfin' Safari, Aug. 8, 2007, Web, whole document, http://webkit.org/blog/114/webcore-rendering-i-the-basics/.

"Scene Graph" Wikipedia, The Free Encyclopedia, Jan. 26, 2011, Web, whole document, http://en.wikipedia.org/wiki/Scene_graph.

Gessner R: "Netscape' s Gecko: The Next-Generation Layout Engine", Mar. 1999, Web, p. 7-8, retrieved on May 4, 2001, http://webtechniques.comjarchives/1999/03jgessner/.

Istvan Beszteri et al, "Vertical Navigation of Layout Adapted Web Documents", Journal World Wide Web, Mar. 2007, pp. 1-35, Kluwer Academic Publishers, Hingham, MA, USA.

Pohja M et al, "CSS Layout Engine for Compound Documents", Web Congress, 2005, Oct. 31, 2005, pp. 148-156 (figures 1,6 p. 151, left-hand column—p. 152, left-hand column), LA-Web 2005. Third Latin America, Piscataway, NJ, USA.

International Search Report and Written Opinion, International Application No. PCT/EP2011/068, dated Mar. 5, 2012, pp. 3, 4, 6 and 8-15, International Searching Authority European Patent Office, Munich, Germany.

WebKit Rendering "WebCore Rendering I: The Basics" by Dave Hyatt: http://webkit.org/coding/technical-articles.html Aug. 8, 2007.

CSS 2.0 Specification "Cascading Style Sheets, level 2": http://www.w3.org/TR/2008/REC-CSS2-20080411/css2.pdf as revised Apr. 11, 2008.

Office Action issued in Chinese Application No. 201180062749.3 on Sep. 5, 2016.

Communication Pursuant to Article 94(3) EPC issued in European Application No. 11782076.1 on Oct. 26, 2016.

* cited by examiner

DISPLAYING SELECTED PORTIONS OF DATA SETS ON DISPLAY DEVICES

FIELD OF THE INVENTION

The present invention relates to a method for displaying a selected portion of a data set within a display area of a display device.

More particularly, but not exclusively, the present invention relates to a method of displaying a selected portion of a data set within a display area of a display device where the data set relates to a structured document. The data set may be derived from content described in a mark-up language, such as HTML, and/or from one or more workspace data items including emails, calendar entries, contacts, etc. The display device within which the selected portion of the data set may be displayed may be a monitor or a touch-screen display that is connected to or embedded within a computing device.

BACKGROUND OF THE INVENTION

Internet browsers are known which may be configured to display a portion of a data set, such as a data set relating to a HyperText Mark-up Language (HTML) document, within a display area of a display device. Only a portion of the data set may be displayed within the display area at any one time, as there may not be sufficient space within the display area to display the entire data set.

When displaying a data set, an internet browser processes the data set in order to identify and subsequently display elements of the data set that are located within the portion to be displayed; however this typically requires that the browser processes all elements in the data set, despite the fact that only a subset of the data set will be rendered.

The present invention aims to provide an improved method for displaying a selected portion of a data set within a display area of a display device.

SUMMARY OF THE INVENTION

In accordance with one aspect of the disclosure, there is provided a method for displaying a selected portion of a data set within a display area of a display device such as a monitor or a touch-screen display according to the appended claims. Preferred features of the method are set out in the dependent claims.

The embodiments described herein are concerned with providing a method for displaying a selected portion of a data set within a display area of a display device, wherein the data set comprises a plurality of elements and grouping information for the elements that defines a plurality of groups of elements, each of said groups including a higher-level element and one or more lower-level elements, the method comprising:

processing layout information for said plurality of elements to identify one or more elements to be rendered for display in said display area, the layout information indicating a region occupied by a respective element within a layout area of the data set, the elements being identified on the basis of whether the region occupied by a respective element corresponds with a selected portion of the layout area of the data set;

rendering the identified elements; and displaying at least part of the rendered elements in the display area of the display device, wherein identification of the elements to be rendered comprises processing said elements in groups defined by said grouping information including processing a group differently in dependence on whether a higher-level element of the group has a predefined spatial relationship with respect to one or more lower-level elements in the group.

By processing a group of elements differently in dependence on whether a higher-level element of a group has a predefined spatial relationship with respect to one or more lower-level elements in the group, embodiments of the present invention are able to take advantage of the grouping information within the data set and then process the data set on a group-wise basis in dependence on this predefined spatial relationship. More specifically, the method is able to more efficiently process elements which are members of groups for which the pre-defined spatial relationship has been identified.

The pre-defined spatial relationship may indicate whether one or more of the lower-level elements in a group occupy a region within the layout area of the data set that is within the region occupied by the higher-level element of the group. If at least one of the one or more lower-level elements in a group occupies a region outside the region occupied by the higher-level element, the group does not have the pre-defined relationship.

A directed acyclic graph (DAG) is one example of a data set. The DAG includes a set of vertices, and each element in the plurality of elements of the data set may correspond with a vertex in the DAG. The DAG includes a set of directed edges, where each edge connects from a first vertex to a second vertex. Each edge may thus define a relationship between a higher-level element (i.e. the element corresponding to the vertex that the edge connects from) and a lower-level element (i.e. the element corresponding to the vertex that the edge connects to). The set of edges of the DAG may thus correspond to the grouping information of the data set. In an embodiment of the invention, the data set may relate to a structured document. The plurality of elements of the data set may be organised in a hierarchy of elements, and this hierarchy of elements may define the grouping information.

Each element in the hierarchy of elements may correspond to an object in a hierarchy of objects that forms a Document Object Model (DOM) tree. This DOM tree may represent the structured document. Each element may thus correspond with, for example, an HTML <p> tag that represents a paragraph of text, or an HTML <a> tag that represents a hyperlink, or an HTML <div> tag that represents a division or section, etc., each of which may form part of the structured document. An element may comprise zero or more child elements that form part of a level in the hierarchy of elements below that of the element.

Each element in the hierarchy of elements may correspond to a node in a hierarchy of nodes that forms an intermediate representation of the hierarchy of objects in the DOM tree. An intermediate representation of the DOM tree may be constructed in order to allow for the structured document to be more efficiently processed when rendering selected portions than would be possible if processing the DOM tree itself.

The data set may additionally or alternatively relate to a set of workspace data items such as emails, calendar entries, etc. One or more elements in the hierarchy of elements may be at least partly derived from the workspace data items in said set, such as emails, calendar items etc. so that information relating to the emails or calendar items may be displayed within the display area of the display device when a selected portion of e.g. available emails is displayed.

The data set may additionally or alternatively relate to an image. One or more elements in the hierarchy of elements may correspond with shapes or objects that form part of that image, and may be derived from content described in a mark-up language, for example an XML-based language such as Scalable Vector Graphics (SVG).

The data set may additionally or alternatively relate to a mathematical equation. One or more elements in the hierarchy of elements may correspond with shapes or objects that form part of that mathematical equation, and may be derived from content described in a mark-up language, for example an XML-based language such as Mathematical Markup Language (MathML).

Examples of groups as defined in the grouping information are as follows: a group may comprise a first element, the first element being the higher-level element of the group, and the child elements of this first element being the lower-level elements of the group. Alternatively a group may comprise a plurality of lower levels, the first lower level comprising one or more elements that are the children of the higher-level element of the group, the second lower level comprising one or more elements that are the children of the higher-level element, etc. A group thus typically comprises the higher-level element and all descendents of the higher-level element of the group.

Accordingly, in one arrangement, the above-mentioned pre-defined spatial relationship may be determined according to whether the region occupied by all descendents of the higher-level element occupies a region within that occupied by the higher-level element in the group. This can be derived from the layout information, which, for example, indicates a region occupied by a respective element within a layout area of the data set. The layout area of the data set may be an area which the entire structured document may occupy.

The selected portion of the layout area of the data set may be a portion of the structured document that has been selected for display in the display area in order to allow this portion to be viewed. If the region occupied by a respective element at least partly occupies a region within the selected portion of the layout area, then that region may correspond with a selected portion of the layout area of the data set. Accordingly the elements identified for rendering are those that are to be rendered for display in the display area as a result of them occupying a region within the selected portion of the data set. Advantageously the invention allows for group-based processing as part of this process, whereby a group is processed differently based upon whether or not the higher-level element of the group has the predefined spatial relationship with respect to a region occupied by the lower-level elements in the group.

More specifically, identification of the elements to be rendered preferably comprises processing said elements in groups including:

a group comprising one or more lower-level elements at said first lower level and one or more lower-level elements at said second lower level; and one or more lower-level groups comprising elements from said group, a said lower-level group excluding said higher-level element and including a element at said first lower level and one or more elements at said second lower level, the processing of said elements in groups comprising:

processing said group differently in dependence on whether a region occupied by the higher-level element of the group has a predefined spatial relationship with respect to a region occupied by the lower-level elements in the group; and if the region occupied by the higher-level element of the group does not have the predefined spatial relationship with respect to the region occupied by the lower-level elements in the group, processing said one or more lower-level groups of elements differently in dependence on whether a region occupied by the first lower-level element of a first lower-level group has a predefined spatial relationship with respect to a region occupied by the one or more second lower-level elements in the lower-level group.

The processing of a group may comprise either processing all of the elements in the group, or processing only a portion of the elements in the group. Processing either all the elements or only a portion of the elements may be conducted on the basis of whether a higher-level element of the group has a predefined spatial relationship with respect to one or more lower-level elements in the group.

Accordingly, in the case of a group having the predefined spatial relationship such that all lower-level elements are co-located with the higher-level element, the processing comprises:

determining a correspondence between the region occupied by the higher-level element and the selected portion of the layout area of the data set; and selecting not to determine a correspondence between the region occupied by at least one of the lower-level elements and the selected portion of the layout area of the data set.

As a result, for groups for which all of the lower-level elements are co-located within the region occupied by the higher-level element of the group it is not necessary to determine the correspondence between the selected portion of the layout area and the region occupied by the lower-level elements. Thus, and when the higher-level element does not lie within the selected portion, less processing overall is required when rendering the data set because the lower-level elements can be ignored entirely.

Conversely, for groups for which one or more of the lower-level elements are not co-located within the region occupied by the higher-level element of the group, the correspondence between the selected portion of the layout area and the region occupied by the lower-level elements is determined, in case the location of one or more lower-level elements overlaps with the selected portion.

The pre-defined spatial relationship between the elements within a group is preferably captured by way of group layout information and is used during said processing to identify one or more elements to be rendered for display in said display area. Further, the group layout information may be generated and stored when appropriate, prior to the rendering of elements.

When said group layout information is stored it can be used repeatedly, in the following manner:

processing layout information including said stored group layout information, to identify one or more elements to be rendered for display in said display area, when the selected portion of the layout area of the data set covers a first part of the layout area of the data set; and re-processing said layout information including said stored group layout information, to identify one or more elements to be rendered for display in said display area, when the selected portion of the layout area of the data set covers a second, different part of the layout area of the data set.

Alternatively, the group layout information may be used whenever the selected portion of the layout area of the data set changes, such as when the selected portion of the layout area is scrolled in order to bring a different portion of the data set into view. The group layout information may therefore provide an additional processing benefit by allowing groups in the plurality of groups of elements to be processed differently multiple times.

Furthermore the stored group layout information may be used in the processing of layout information (including processing of said stored group layout information) to identify one or more elements to be rendered for display in said display area, storing selection data identifying the identified elements and rendering the identified elements, when said one or more elements are to be rendered in a first display state; and re-rendering the identified elements, on the basis of said stored selection data, when said one or more elements are to be rendered in a second, different, display state.

As a result group layout information may be used a plurality of times, for example it may be used whenever the display state of the one or more elements changes, such as when the colour of an element changes. The group layout information may therefore provide an additional processing benefit by allowing groups in the plurality of groups of elements to be processed differently multiple times.

In a particularly beneficial arrangement, at least one new group of elements is defined whereby to modify said grouping information associated with the data set. The new group of elements may include both a subset of the original lower-level elements of an original group defined in the grouping information, and a configuration element that is at a higher-level than the elements in said subset. The original higher-level element of the original group is at a higher-level than is the configuration element.

The introduction of this new group of elements may provide a reduction in processing when identifying elements for rendering a selected portion of the data set compared to the amount of such processing required prior to the addition of the new group, particularly where the original lower-level elements comprised a relatively large number of elements. For example, if, when identifying elements for rendering, the configuration element of the new group does not correspond with a selected portion of the data set, then the subset of the original lower-level elements in the new group does not require processing in order to identify elements for rendering, even if the parent of the configuration element (i.e. the original higher-level element) and its other children require processing in order to identify elements for rendering.

In contrast, prior to the addition of the new group, all children of the higher-level element would require processing in order to identify elements for rendering if the higher-level element required such processing.

According to other aspects of the present invention there is provided a device comprising a display screen and configured with software arranged to perform the afore-mentioned method. Preferably the device is a user terminal in the form of a computing device such as a smartphone, an iPad™, a PDA and the like.

DETAILED DESCRIPTION OF THE INVENTION

The present invention relates to a method for displaying a selected portion of a data set within a display of area of a display device. The invention may for example be used to display a data set that relates to a structured document, an image or a mathematical equation, or objects such as workspace data in the form of emails, calendar entries, contacts, folders, etc.

In one embodiment of the invention a data set may relate to a structured document that may be at least partially derived from content described in a mark-up language, such as for example Hyper-Text Mark-up Language (HTML). The content may include a hierarchy of HTML tags such as <p>, <div>, etc. that define the structure and characteristics of the structured document.

Internet browsers (referred to below as browsers) are known which are configured to display such structured documents. In order to display a structured document, a browser constructs from the hierarchy of HTML tags a hierarchy of objects which represents the structured document. This hierarchy of objects is known in the art as a Document Object Model (DOM) tree, and constitutes a data set that relates to the structured document.

Figure 1:
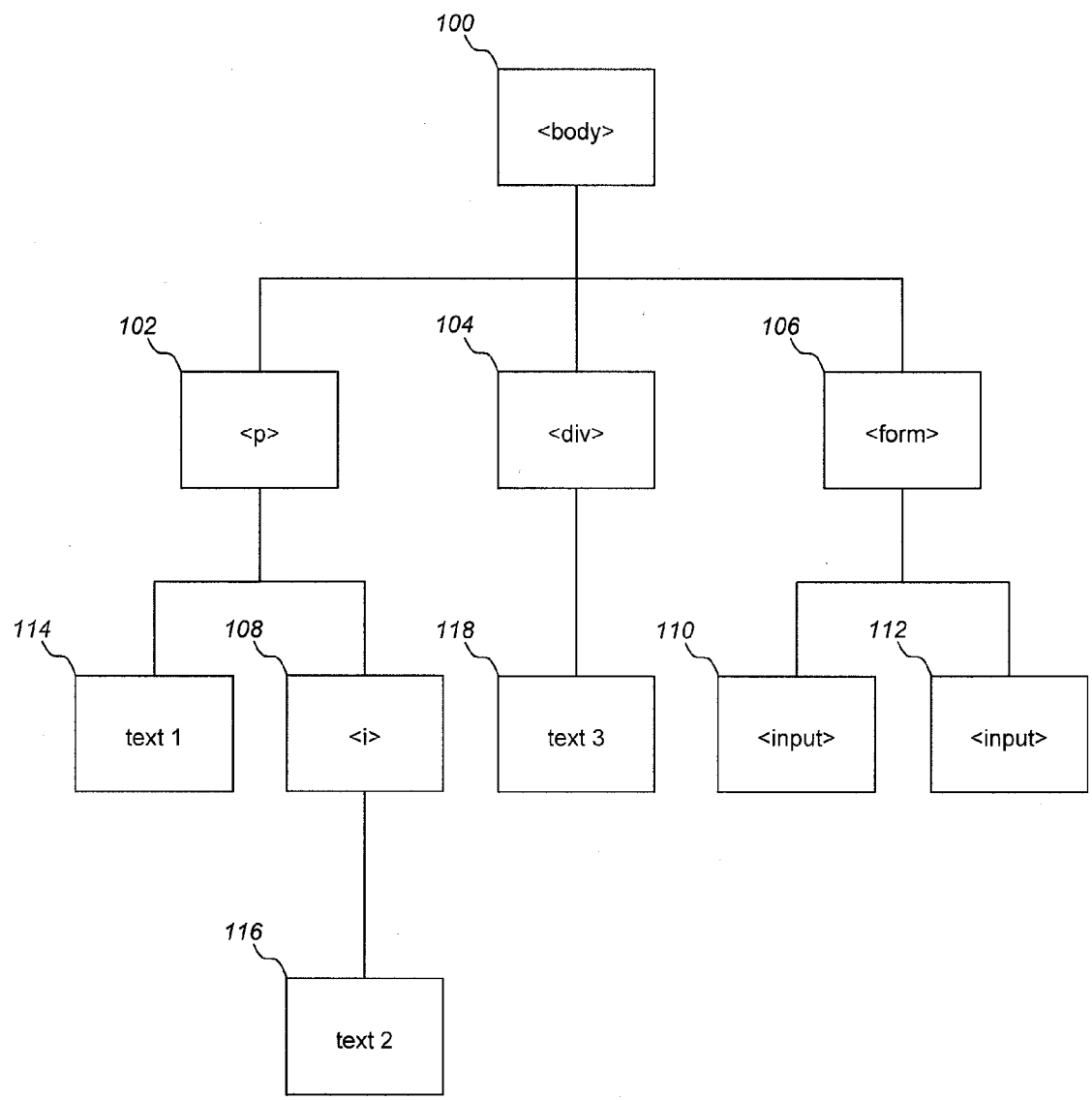
FIG. 1 illustrates an exemplary data set that represents a structured document, according to the prior art.

FIG. 1 illustrates an exemplary DOM tree for a portion of HTML content that represents a structured document, according to the prior art. The DOM tree may comprise a hierarchy of objects including a root object 100 that represents the top of the DOM tree. An object in the DOM tree may comprise zero or more objects, referred to as the children of a given object; for example object 106 has children 110 and 112. With the exception of the root object 100, each object in the DOM tree has a parent object; for example the parent of object 108 is object 102.

The objects 100-112 in the DOM tree of FIG. 1 correspond to tags in the HTML content. Objects 114-118 in FIG. 1 correspond to text contained within a parent tag, whose characteristics are at least partially defined by the parent tag. For example object 116 corresponds to text that has been marked as italic by its parent tag 108.

A browser additionally uses Cascading Style Sheet (CSS) data referenced by the HTML content in order to display a structured document. The browser may use CSS data stored in separate files referenced by the HTML content in conjunction with CSS data embedded in the HTML content. An object in the DOM tree may indicate that style information defined in CSS data should be used to affect characteristics of the object. An object in the DOM tree may also 'inherit' from its parent (or from the parent of its parent, etc.) style information defined in CSS data that should be used to affect characteristics of the object. Each object in the DOM tree may be annotated with the style information from CSS data indicated by the object and/or inherited by the object.

The DOM tree is then processed by the browser in order to display at least a portion of a data set relating to a document within a display area. Processing of the DOM tree may include the generation of intermediate representations of the structured document from the DOM tree, calculation of the layout of objects in the DOM tree (or in a corresponding intermediate representation) within a layout area of the data set, and the rendering of selected objects in the DOM tree (or in a corresponding intermediate representation) that are located within a display area.

The present invention provides an improved method for displaying a selected portion of a data set, such as the exemplary one relating to a structured document described above with reference to FIG. 1, within a display of area of a display device. The invention will now be described in detail within the context of a computing device, which may be configured to perform the invention.

Figure 2:
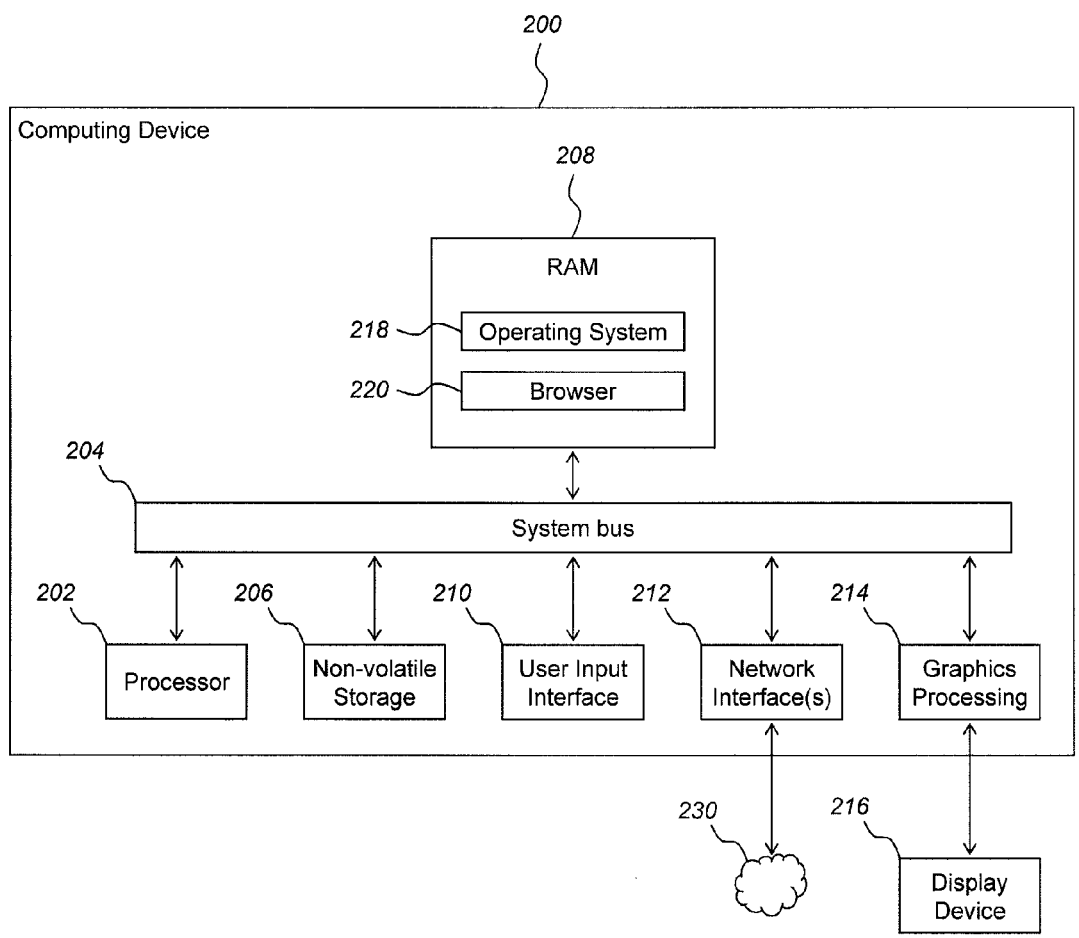
FIG. 2 schematically illustrates the components of a computing device, according to an embodiment of the invention.

FIG. 2 schematically illustrates the components of such a computing device 200, which is an exemplary device used to illustrate the features of the present invention. The computing device 200 may take the form of a computer server, desktop computer, smartphone, a personal digital assistant (PDA), an e-reader, a tablet computer such as an Apple iPad, etc. The computing device 200 includes a processor 202 that is able to transmit control messages to, receive status information from, and transmit data to and from components within the computing device 200 that are connected to a system bus 204, where these components may include a non-volatile storage device 206, random access memory 208, user input interface 210, network interface 212 and graphics processing component 214.

The processor 202, which in this embodiment is a microprocessor, processes instructions stored in the random access memory (RAM) 208 that have been loaded from the non-volatile storage device 206 which could be for example a flash memory or a hard disk drive. These instructions are in the form of computer software in the form of one or more programs that implement an operating system 218 and a browser 220. The RAM 208 is also used by programs running on the processor 202 as a means of storing and accessing data in the form of electronic signals, where the data is used during the execution of the programs.

The operating system 218 is computer software in the form of a program or set of programs whose instructions are loaded from non-volatile storage 206 by the processor 202 and executed when the computing device 200 is turned on. The operating system 218 may start further programs automatically and/or may allow a user to start further programs, for example via a user interface 218 to be described below, provided by the operating system 218. The operating system 218 enables the sharing of the processing power provided by the processor 202 between the programs (e.g. 220) running on the processor 202.

The operating system 218 provides a programmatic interface for programs running on the processor 202 allowing them to request functionality from the operating system 218. This programmatic interface may take the form of procedures, i.e. system calls, which a program running on the processor 202 may use in order to invoke the operating system 218 and request it to provide desired functionality. In response to receiving a request for functionality the operating system 218 may transmit control messages to, receive status information from, transmit data to and/or receive data from components (e.g. 206, 208, 210, 212, 214) connected to the system bus 204 in order to provide the requested functionality, and may also return data to the requesting program as a result.

The operating system 218 may provide a file system for storing, modifying and accessing files held in non-volatile storage 206. This file system may be accessible to other programs running on the processor 202 via the programmatic interface provided by the operating system 218.

The computing device 200 includes a graphics processing component 214 that is able to render graphics in accordance with commands made by programs running on the processor 202 and output these to a display device 216. The display device 216 may be a computer monitor such as a TFT-monitor connected to the computing device 200 via a composite video, component video, Video Graphics Array, Digital Visual Interface, or High-Definition Multimedia Interface connection. In alternative embodiments of the invention the display device 216 may be incorporated within the computing device 200, for example the display device 216 could be a touch-screen display embedded within a smartphone.

Programs running on the processor 202 can process user input obtained from a user input interface 210 that receives user input from a user input device or devices (not shown). The user input devices that may be used to transmit user input to the user input interface 210 may for example include a keypad, keyboard, mouse, remote control and/or touch-screen interface. User input devices may be connected to the computing device 200 via a wired or wireless connection, or may alternatively be incorporated within the computing device 200.

The computing device 200 also includes a network interface 212 (or a plurality of such interfaces) that allows programs running on the processor 202 to transmit and receive data to and from a number of other devices and systems via a communications network 230 (or a plurality of such networks).

The network interface 212 (or the plurality of such interfaces) may include a radio access network interface (or a plurality of such interfaces) that is able to communicate with a wireless access node such as a base station or a wireless access point that provides access to the communications network 230 (or a plurality of such networks). The network interface 212 (or plurality of such interfaces) may be able to connect to the wireless access node using one or more of a number of radio access technologies including Global System for Mobile Communications (GSM), Universal Mobile Telecommunications System (UMTS), Long Term Evolution (LTE), fixed wireless access (such as IEEE 802.16 WiMax), and wireless networking (such as IEEE 802.11 WiFi). The communications network 230 and/or wireless access node may also provide access to the Internet.

The network interface 212 (or the plurality of such interfaces) may also include a modem and/or an Ethernet card or interface for use with a corresponding communications network 230 (or plurality of such networks) such as the Internet and/or a private data communications network.

The operating system 218 may include a networking program that allows communication between programs running on the processor 212 and external devices via the network interface 212 and communications network 140 (or plurality of such networks) using networking protocols such as (for example) the Transmission Control Protocol (TCP) or the User Datagram Protocol (UDP). The networking program and/or networking procedures may be accessible to other programs running on the processor 202 via the programmatic interface provided by the operating system 218.

The browser 220 of the computing device 200 may be configured to perform the present invention in a first embodiment, which involves the processing and rendering of a structured document within a display area of the display device 216.

The structured document may be derived by the browser 220 from HTML content as described above. As is known in the art, the structured document may be configured to allow for it to be laid out within any of a plurality of layout areas, each of different sizes and/or shapes. A dimension of the layout area (e.g. its width) may be selected in order to match a dimension of a display area of the display device 216. Other dimensions of the layout area may be determined by the number of objects within the structured document and their layout within it.

Due to the size of the display area of the display device 216, it may not be possible to display the entire structured document within the display area whilst ensuring that smaller features within the structured document (for example text) are still visible to a user.

The browser 220 may thus be configured to display a selected portion of the structured document within a display area of the display device 216. The selected portion may be a selected region of the layout area of the structured document. The size of the selected portion may be configured to ensure smaller features within the structured document are visible to a user. The selected portion of the document may be changed in order to allow a user to view the entire structured document, one portion at a time.

Figure 3:
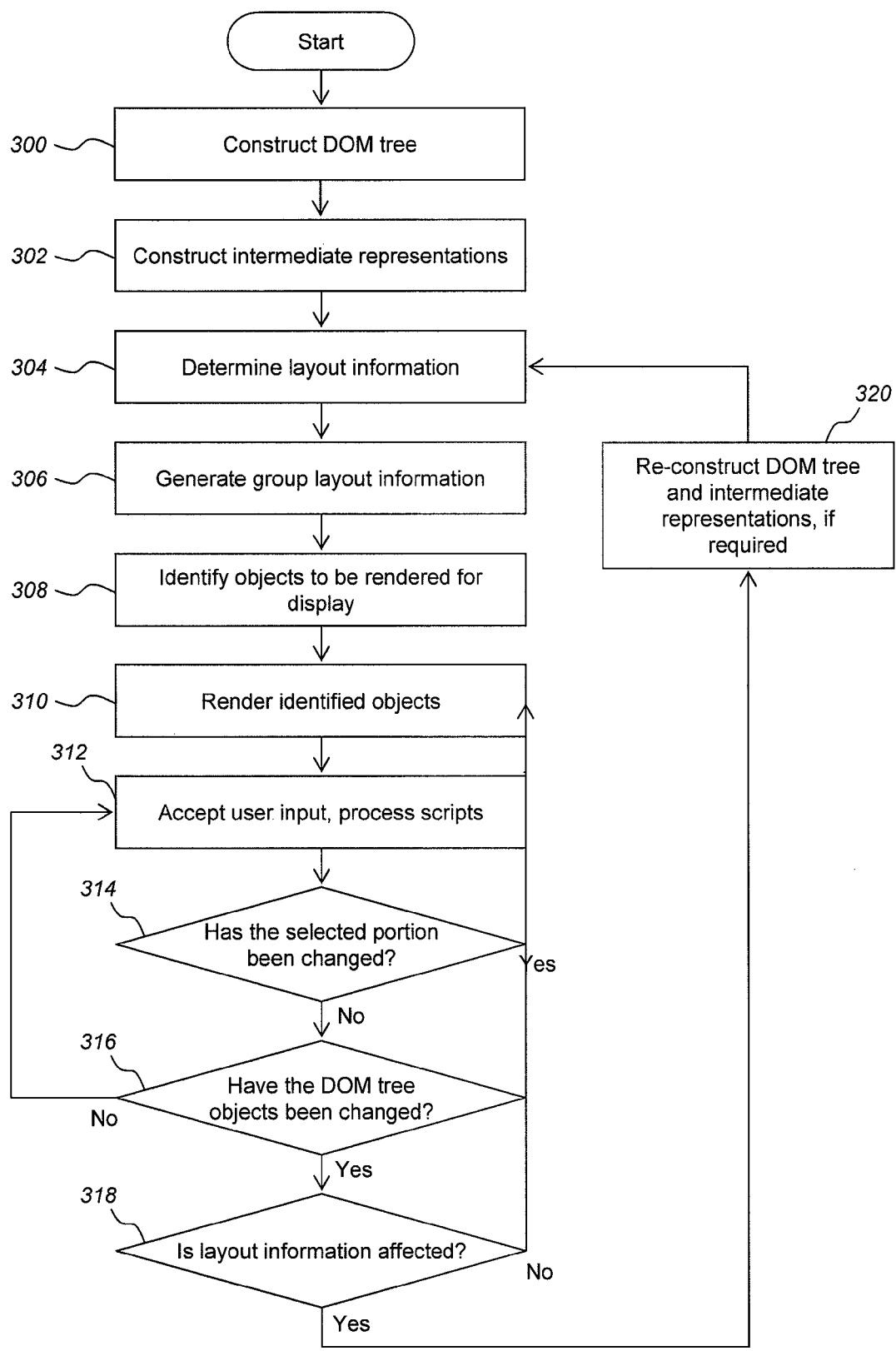
FIG. 3 illustrates steps performed by a browser of the computing device of FIG. 2, according to an embodiment of the invention.

FIG. 3 illustrates steps performed by the browser 220 in order to display a selected portion of a structured document, according to the first embodiment of the invention. Steps 300 and 302 are entirely conventional and are included for completeness.

Initially, the browser 220 derives a DOM tree for the structured document (step 300). The DOM tree may be derived from content in a mark-up language, such as HTML content, as summarised above.

The HTML content may have been received by the browser 220 in the form of an HTML file, from another computing device via the communications network 230, and/or it may alternatively have been received from non-volatile storage 206.

The HTML content may reference zero or more files that the browser may also retrieve from another computing device and/or from non-volatile storage 206. These other files may include CSS files that may contain CSS data relating to styling information (as described above), script files that may contain scripts to be processed by the browser in relation to the HTML content (e.g. JavaScript scripts), media files including audio, image and/or video files, other HTML files, etc. The other files retrieved by the browser 220 may be used in the display of the structured document.

The browser 200 then uses the DOM tree to construct zero or more intermediate representations of the structured document (step 302). Each intermediate representation of the structured document comprises a hierarchy of nodes derived from the hierarchy of objects in the DOM tree. These intermediate representations of the structured document are used to enable the browser 200 to more efficiently render one or more selected portions of the structured document by processing the intermediate representation, rather than by processing the DOM tree itself.

Each node in an intermediate representation of the render tree includes information that may be used by the browser 220 to render the node. Depending on user selection, any given node of the render tree may form part of a selected portion of a structured document that is displayed by the browser.

The browser 220 generates zero or more nodes in an intermediate representation from each object in the DOM tree. A node in an intermediate representation may correspond to a block-level element or inline-level element as defined in the CSS 2.1 specification, e.g. it may correspond to a rectangular box comprising a content area, and optional surrounding padding, border and margin areas.

Style information may also be attached by the browser 220 to each node in an intermediate representation. The style information for a node may be determined from the style information of the object in the DOM tree from which the node was created.

Once any intermediate representations have been constructed, the browser 220 determines layout information for the objects in the DOM tree (step 304).

The layout information for an object in the DOM tree includes information relating to a region occupied by a given such object. The information relating to a region occupied by an object includes the size and position of that object within the layout area of the structured document.

The browser 220 may calculate the layout information for an object in the DOM tree indirectly, by calculating the size and position of the nodes in an intermediate representation that correspond to that object (i.e. that were generated from that object by the browser 220).

The style information for an object in the DOM tree may be used by the browser 220 to determine the region that the object may occupy within the layout area of the structured document. For example, the style information may indicate that the object should be displayed relative to the position of its parent object, or at an absolute position within the layout area of the structured document, or according to a particular positioning scheme defined by the CSS 2.1 Specification. The style information may also indicate that the size of a parent block may be determined by the size of and the number of child blocks of the parent block, as some of the child blocks may be configured to be contained within the parent block, whose size must be selected to accommodate them.

Since at least some of the style constraints require e.g. that parent blocks are laid out before the position of the child nodes can be calculated, the browser 220 may need to process the objects in the DOM tree (or the nodes in an intermediate representation to which they correspond) multiple times in order to determine size and position of each object that is included in the layout information.

The browser 220 may for example perform at least a first and a second pass over the objects in the DOM tree. In the first pass the browser 220 may process the hierarchy of objects in the DOM tree from the root node (e.g. 100) to each child object that has no further child objects in a 'depth-first' manner, i.e. processing the children of a child object before processing its siblings. In this manner each object in the DOM tree may be assigned an initial size and position within the layout area of the structured document. The browser 220 may then perform a second pass of the hierarchy of objects in the DOM tree starting from the bottom of the tree i.e. from each child object that has no further-child objects upwards. In the second pass, the browser 220 will calculate the size and position of an object after all the child objects of that object (and the child objects of the child objects, etc.) have had their size and position determined.

The layout information, once determined by the browser 220, may be stored by the browser 220 (e.g. in RAM 208) for use multiple times in displaying selected portions of the structured document, as described in greater detail below.

Once the layout information for each object in the DOM tree (or the nodes in an intermediate representation to which they correspond) has been determined, the browser 220 generates group layout information for the objects in the DOM tree (step 306).

The group layout information generated for an object in the DOM tree defines a spatial relationship with the child objects of that object. The spatial relationship can be pre-defined and specify a particular relationship between the region within the layout area of the structured document occupied by that object and the region within the layout area occupied by that object's child objects (and their child objects, etc.).

Figure 4A:
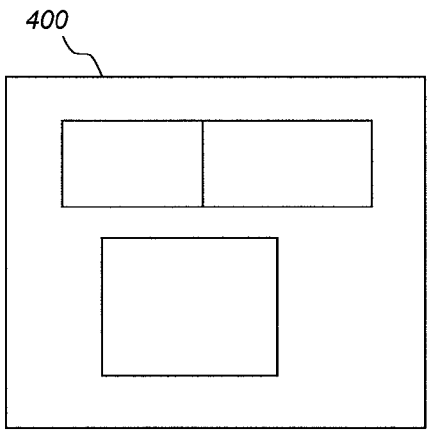
FIGS. 4a to 4d illustrate regions occupied by objects of a data set, according to an embodiment of the invention.

In one embodiment, the pre-defined spatial relationship specifies that child objects of an object are located within the region in the layout area occupied by that object. In other words, the pre-defined spatial relationship may specify that the child objects of an object are located within a subset of the two-dimensional Euclidean space occupied by that object. FIG. 4a illustrates the region occupied by an object 400, and the region occupied by three child objects of that object. As the child objects of object 400 object are located within the region occupied by that object, the object 400 has the pre-defined spatial relationship with its child-objects.

Figure 4B:
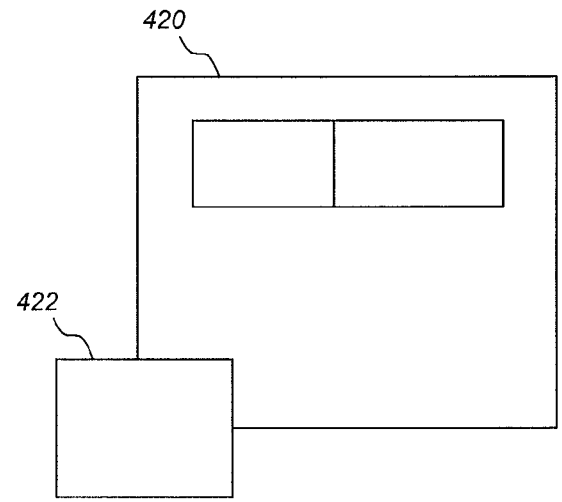

Conversely, if at least one of the child objects of an object falls outside the region in the layout area occupied by that object, then that object may not have the pre-defined spatial relationship with the child-objects of that object. FIG. 4b illustrates the region occupied by an object 420, and the region occupied by three child objects of that object including child object 422 which falls outside the region occupied by the object 420. As at least one of the child objects of the object 420 falls outside the region occupied by that object, the object 420 does not have the pre-defined spatial relationship with its child-objects.

If an object has at least one child object that falls outside the region in the layout area occupied by that object, and at least one of the child objects of the object also falls outside the region occupied by the parent of the object, then neither the object nor the parent of the object has the pre-defined spatial relationship with its respective child-objects. This may also extend to the case where the grandchildren objects of the object (i.e. two levels below the first object in the hierarchy of the DOM tree) fall outside the region occupied by the object, and to their child objects, etc. (i.e. the third and lower levels below the object).

Figure 4C:
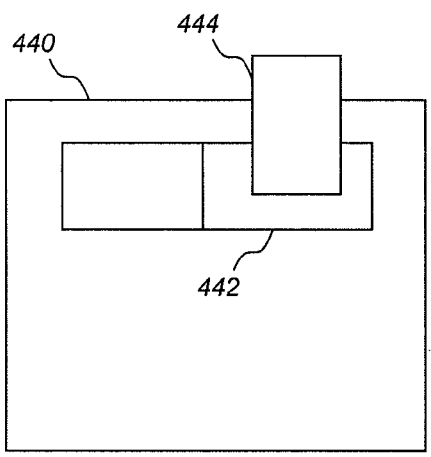

FIG. 4c illustrates the region occupied by an object 440, and the region occupied by two child objects of the object including child object 442 which falls inside the region occupied by the object 440. Child object 442 itself has a child object 444 that falls outside the region occupied by the child object 442 and the object 440; hence neither the object 440 nor the child object 442 has the pre-defined spatial relationship with its respective child-objects.

Figure 4D:
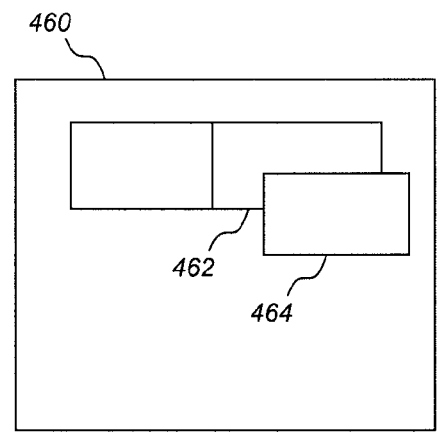

FIG. 4d illustrates a contrasting example to that of FIG. 4c. In FIG. 4d the region occupied by an object 460, and the region occupied by two child objects of the object including child object 462 falls inside the region occupied by the object 460. Child object 462 has a child object 464 that falls outside the region occupied by the child object 462, but inside the region occupied by the object 460. Thus the object 460 has the pre-defined spatial relationship with its child-objects, but the child object 462 does not have the pre-defined spatial relationship with its child-objects 464.

The group layout information, generated in accordance with the above examples, may be stored for use multiple times by the browser 220 to display selected portions of the structured document, as will now be described with reference to step 308 onwards.

The browser 220 identifies objects in the DOM tree (or the nodes in an intermediate representation to which they correspond) that are to be rendered for display in the display area of the display device (step 308). This may involve processing the layout information for the objects in the DOM tree, in particular identifying whether the region occupied by the objects within the layout area of the structured document corresponds with whichever portion of the layout area of the structured document has been selected for display by the user.

Figure 5:
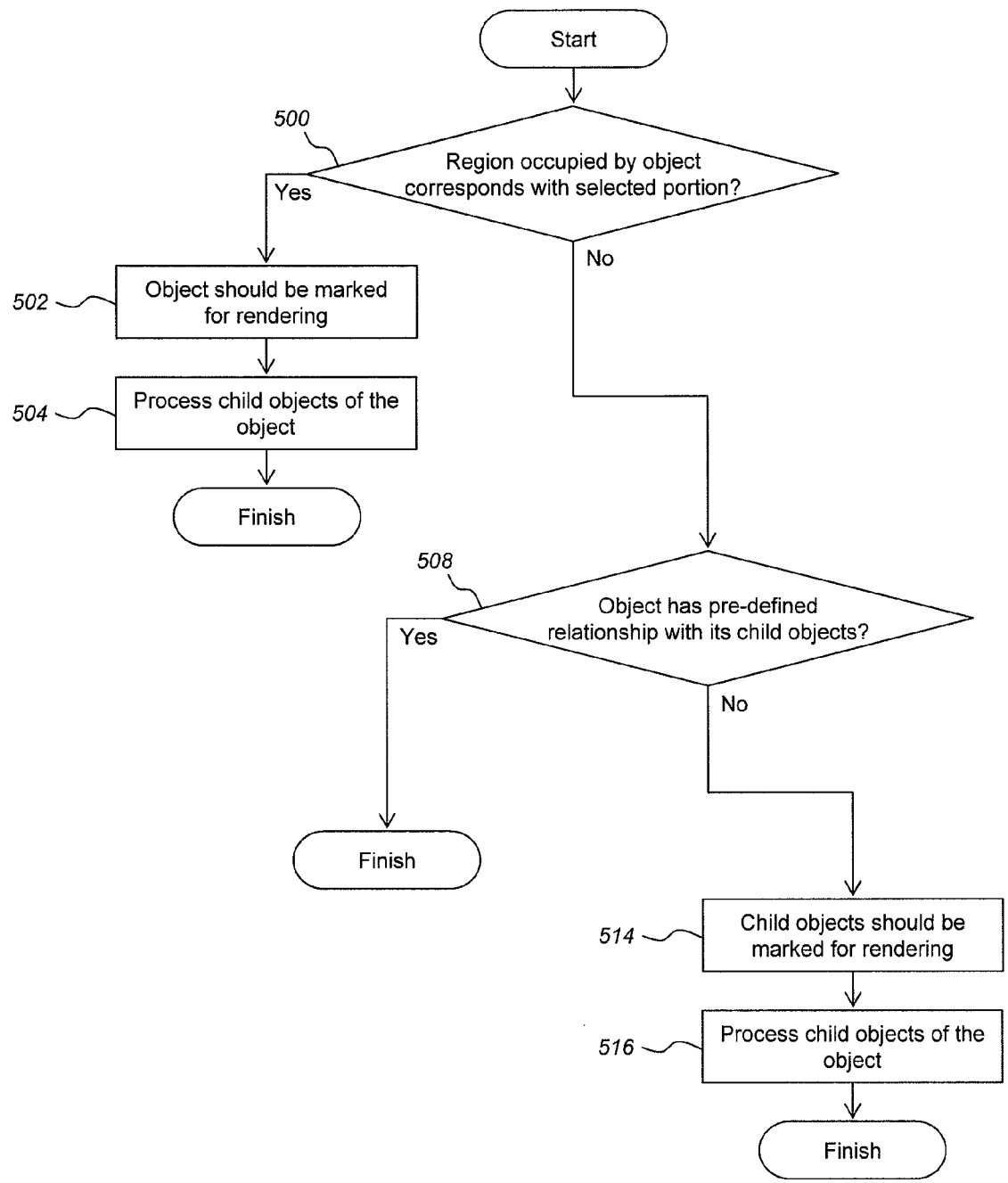
FIG. 5 illustrates steps performed by a browser of the computing device of FIG. 2, according to an embodiment of the invention.

This involves the browser 220 using the group layout information (generated in step 306) for the objects in the DOM tree (or the nodes in an intermediate representation to which they correspond) to identify objects that are to be rendered, as will now be explained with reference to FIG. 5. For each object in the DOM tree (or the nodes in an intermediate representation to which the object corresponds) that the browser processes, the browser 220 tests whether the layout information for that object indicates that the region occupied by the object corresponds with the selected portion of the layout area of the structured document (step 500).

If the region occupied by the object at least partially corresponds with the selected portion of the layout area of the structured document, i.e. the object at least partially occupies a region within selected portion of the layout area, the browser 220 identifies, or marks, the object for rendering (step 502).

The browser 220 then processes each child object (or the nodes in an intermediate representation to which those objects correspond) of that object, in order to identify whether those objects should be marked for rendering (step 504).

If the region occupied by the object does not correspond with the selected portion of the layout area of the structured document, i.e. the object does not occupy even a portion of a region within the selected portion of the layout area, the browser 220 checks whether the group layout information indicates whether that object has the pre-defined spatial relationship with the child objects of that object (step 508).

If the object has the pre-defined spatial relationship with the child objects of that object, which is to say that all of the child objects of that group are wholly contained within the object, the browser 220 determines that none of the child objects of that object are co-located with the selected portion of the layout area. The browser 220 therefore effectively ignores the child objects of the object.

Similarly, if the child objects of the object have further child objects of their own, then the browser 220 may also ignore the further child objects If however (in step 508) the child objects are not wholly contained within the object, it is possible that the child objects of that object might occupy a portion of a region within selected portion of the layout area (step 514). Accordingly the browser 220 processes each child object (or the nodes in an intermediate representation to which those objects correspond) of that object, in order to identify whether those objects should be rendered, and marks the objects for rendering or otherwise depending on their respective locations with respect to the selected portion of the layout area (step 516).

The browser 220 thus uses the group layout information (generated in step 306) for the objects in the DOM tree (or the nodes in an intermediate representation to which they correspond) so as to reduce the number of objects in the DOM tree that need to be tested in order to determine which objects should be marked for rendering.

The browser 220 is therefore able to identify objects for rendering more efficiently than would be possible if it tested each object in the DOM tree (or the nodes in an intermediate representation to which each object corresponds), as is done in the prior art. The method performed by the browser 220 is particularly effective when the number of objects in the DOM tree that have the pre-defined spatial-relationship is relatively large compared to the number of objects that do not, as is common in structured documents derived from HTML content.

The browser then renders the objects marked for rendering (or the nodes in an intermediate representation to which they correspond) within the display area of the display device 216 in order to display the selected portion of the layout area of the structured document (step 310).

As will be appreciated from the foregoing, when rendering an object marked for rendering the browser 220 uses the layout information to determine the region within which the object should be rendered within the display area. The object, the styling information attached to the object, and the content described in a mark-up language from which the object is derived (e.g. an HTML tag) may all affect what is rendered by the browser 220 for an object. For example, the object may be derived from an HTML <input> tag, and a button may therefore be displayed, or the object may be derived from the text of an HTML paragraph (<p>) tag with styling information indicating that the text should be displayed with an underline, etc.

Further, the browser 220 may render the one or more identified objects in a specified order which may be derived from the content described in a mark-up language from which the DOM tree was derived. For example as described above, the content described in a mark-up language may include a hierarchy of HTML tags with referenced and/or embedded CSS data. The CSS data for one or more of the HTML tags may include a 'z-index' property that specifies a position within a specified order which objects derived from that HTML tag should be rendered, as, for example, is described in the CSS 2.1 Specification.

An intermediate representation of the objects in the DOM tree (or of the nodes in an intermediate representation to which those objects correspond) described above may be generated by the re-arrangement of the objects in the order indicated by the specified order. This may allow the browser 220 to more efficiently re-render the objects in the DOM tree (or the nodes in an intermediate representation to which those objects correspond), should this be required after the initial display of a structured document. Re-rendering of a selected portion of a structured document and why this may be required is described in greater detail below.

Once a selected portion of a structured document has been displayed (e.g. in step 310), and/or whilst a selected portion is being displayed, the browser 220 may accept and process user input, and/or process scripts in relation to the structured document (step 312).

The user input may indicate that the user wishes to select a different portion of the structured document for display in the display area of the display device 216. For example, the user may scroll through the displayed structured document using a touch-screen input interface, mouse, keypad, keyboard, etc, causing the browser 220 to respond by changing the selected portion of the structured document.

Alternatively the user input may indicate that the user wishes to change the size of the display area, which may also change the size of the selected portion of the structured document. Again, the browser 220 will respond by changing the selected portion of the structured document.

Any one of these actions triggers the browser 220 to detect whether the selected portion of the structured document has been changed (step 314). If the selected portion has changed, the browser 220 may then return to step 308 to identify objects in the DOM tree (or the nodes in an intermediate representation to which they correspond) that must now be rendered for display in the display area of the display device 216, as a result of the change in the selected portion. The browser will then continue to step 310 to render the identified objects in the DOM tree, etc.

As regards scripts embedded in or referenced by the structured document, the browser 220 detects whether the scripts processed (e.g. in step 312) have made changes to the DOM tree (step 316). Scripts that may make changes to the DOM tree include for example JavaScript scripts that are referenced by the content described in a mark-up language from which the DOM tree is derived. These scripts may be embedded within the content described in a mark-up language, and/or they may be in separate script files that are referenced by the content described in a mark-up language (and that may have been retrieved by the browser 220 as described above). Further, the scripts may be executed in response to events detected by the browser 220. These events may include user input events, document related events such as completion of the loading or display of the document, other known HTML events, etc.

The scripts may as a result change style information attached to objects in the DOM tree, and/or change other properties and/or information (e.g. text, images, etc.) relating to those objects in the DOM tree, and/or add or remove elements to/from the DOM tree.

The sizes, shapes and/or positions of objects in the DOM tree may be changed indirectly (as well as directly). For example the scripts may make changes to the styling information of objects, such as their font size or positioning scheme, which in turn will affect the size, shape and/or position of those objects.

The layout information for the objects in the DOM tree may also be changed if objects are added to or removed from the DOM tree by the scripts. For example a script may add a new object that corresponds to a new HTML <form> tag to the DOM tree, for which layout information will need to be calculated, and which may also affect the position of other objects in the DOM tree.

It will be appreciated that such changes (e.g. to the DOM tree) made by scripts may require re-rendering of objects in the DOM tree (or the nodes in an intermediate representation to which they correspond).

If the browser 220 detects that no changes have been made to the DOM tree by scripts, the browser 220 will continue to receive user input and process scripts by returning to step 312.

Otherwise, in response to the detection of changes to the DOM tree the browser 220 identifies whether the changes may have affected the layout information (step 318).

If the browser 220 detects that changes made by scripts have not affected the size, shape and/or positions of any objects in the DOM tree then the changes made may relate to, for example, changes in the font colour of a block of text, changing a displayed image within a fixed area, etc. The browser 220 may thus return to step 310 in order to re-render the identified objects in the DOM tree so that the changes made can be displayed correctly.

If the browser 220 detects that the change affects the size, shape and/or position of an object in the DOM tree, the browser 220 re-constructs the DOM tree and any intermediate representations previously generated from it, if necessary (step 320). The browser 220 may need to re-construct the DOM tree if one or more objects are added to or removed from the DOM tree, as the parent and/or child objects of one or more objects in the DOM tree may need to be updated as a result of the adding or removal of objects to/from the DOM tree. The browser 220 may re-construct only those portions of the DOM tree that are affected by the changes made.

If the browser 220 reconstructs the DOM tree (or a portion of it), the browser may construct zero or more intermediate representations of the structured document from the DOM tree as summarised above (in step 302).

Once the DOM tree and any intermediate representations have been re-constructed (as necessary), the browser 220 returns to step 304 in order to re-determine the layout information for the objects in the DOM tree (or the elements in an intermediate representation to which they correspond). The browser 220 also re-generates the group layout information in step 306, as changes in the layout information may affect the group layout information, before identifying objects in the DOM tree that must now be rendered for display in step 308, and rendering the identified objects in step 310, etc.

Figure 6:
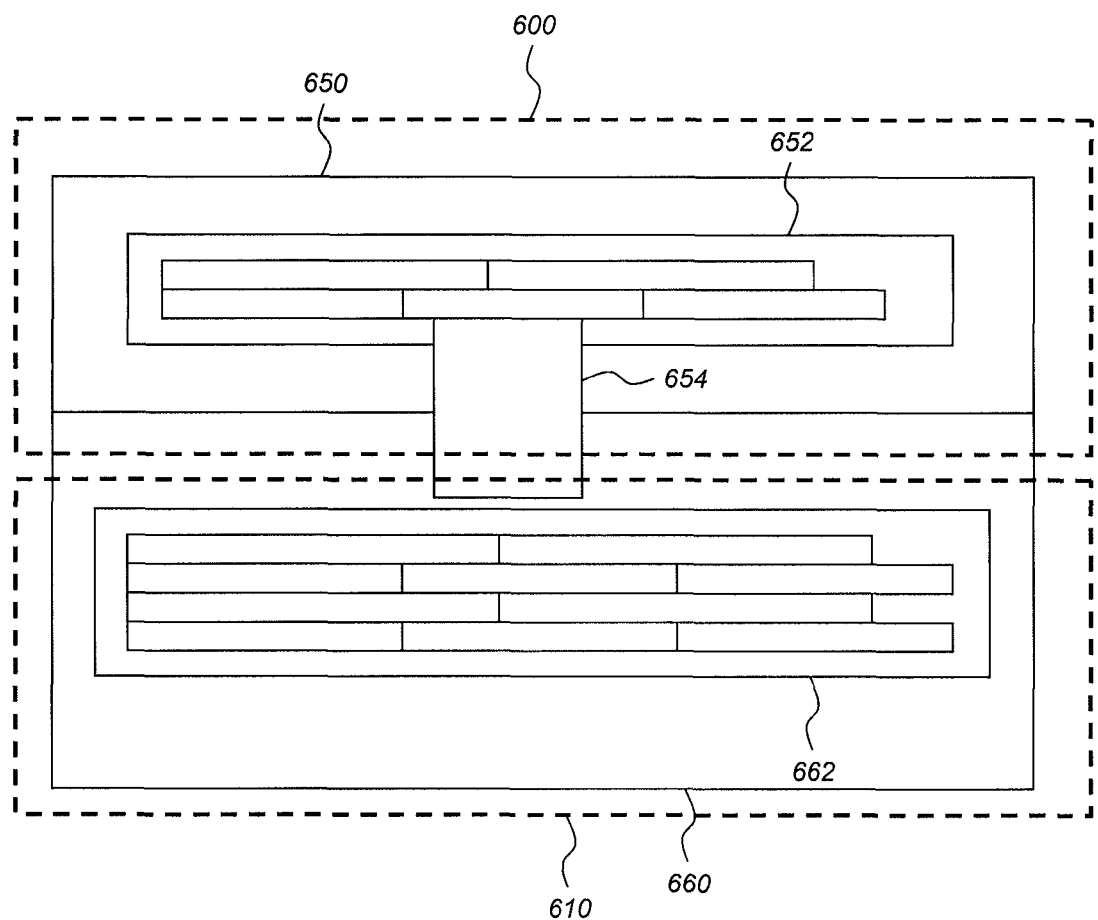
FIG. 6 illustrates an exemplary data set relating to a structured document and two selected portions of that data set.

The features of the invention will now be illustrated in relation to an exemplary structured document and two selected portions of that structured document, illustrated in FIG. 6. The DOM tree of the structured document consists of a root node (not shown) having child-objects 650 and 660. Object 650 consists of one child object 652, which itself consists of a number of child objects including child object 654. Object 660 consists of child object 662, which itself consists of a number of child objects.

Object 654 occupies a region that falls outside the region occupied by its parent object 652, and outside the region occupied by that object's parent (i.e. outside the region of object 650). Objects 650 and 652 therefore do not have the pre-defined spatial relationship with their child objects. All other objects in FIG. 6 do have the pre-defined spatial relationship with their child objects.

In order to display a selected portion of the structured document, the browser 220 will operate in accordance with the steps of FIG. 3 described above, as will now be explained.

The browser 220 first identifies one or more objects that should be displayed in order to display selected portion 600 of the structured document. The browser determines that the regions occupied by objects 650 and 660 both correspond with the selected portion 600 of the layout area of the structured document, and hence that these objects should be marked for rendering (as object 650 is contained within portion 600, while object 660 overlaps with portion 600).

The browser 220 determines that the region of object 662 does not correspond with the selected portion 600, and hence will determine that object 662 should not be marked for rendering. As a result, and as object 662 has the pre-defined relationship with its child objects, the browser 220 need not process the child objects of object 662.

The browser 220 on the other hand determines that object 652 and its child objects including object 654 should be marked for rendering, and will thus proceed to render the marked objects within a display area.

The browser 220 may alternatively display objects within selected portion 610. The browser 220 determines that the region of objects 660 and 662 correspond with the selected portion 610 of the layout area of the structured document, and hence that object 660, 662 and its child objects should be in the one or more identified objects.

The browser 220 determines that the region of object 650 does not correspond with the selected portion 610, and hence will determine that object 650 should not be marked for rendering. However, as object 650 does not have the pre-defined spatial relationship with its child objects, the browser 220 must also process object 652.

The browser 220 determines that the region of object 652 does not correspond with the selected portion 610, and hence will determine that object 650 should not be marked for rendering. However, object 652 does not have the pre-defined spatial relationship with its child objects because object 654 extends outside of the region occupied by object 652, so the browser 220 must also process its child objects including object 654.

The browser 220 then determines that, by virtue of the overlap between object 654 and portion 610, the region of object 654 does correspond with the selected portion 610, and hence that object 654 should be marked for rendering.

The browser 220 will then render the one or more identified objects for display within a display area.

The examples illustrated in FIG. 6 demonstrate how the present invention may be used to reduce the amount of processing required to display a selected portion of a structured document. When selected portion 600 is displayed the browser 220 need not process the children of object 662, as this object does not correspond with the selected portion 600 and has the pre-defined spatial relationship with its child objects. When selected portion 610 is displayed the browser 220 will still process object 650 and object 652, because they do not have the pre-defined spatial relationship with their child objects, thereby ensuring that object 654 is correctly displayed within the selected portion 610.

A second exemplary embodiment of the invention will now be described. The second embodiment proceeds according to the first embodiment described above, however when one or more intermediate representations are created from the DOM tree in step 302, the browser 220 may define new groups of objects, in order to reduce the number of objects that the browser 220 has to process when displaying a portion of the structured document.

For example, the browser 220 may add one or more configuration objects to the DOM tree and make each configuration object the parent of a subset of objects, in order to create a new group of objects. Each subset of objects may have previously been a subset of the children of an object in the DOM tree constructed in step 300. Configuration objects added by the browser 220 to the DOM tree are typically not rendered for display by the browser 220 in step 310, even if they are located within the selected portion of the layout area; however the children of configuration objects may be rendered in step 310 if they are located within the selected portion of the layout area, as described in greater detail below.

Figure 7:
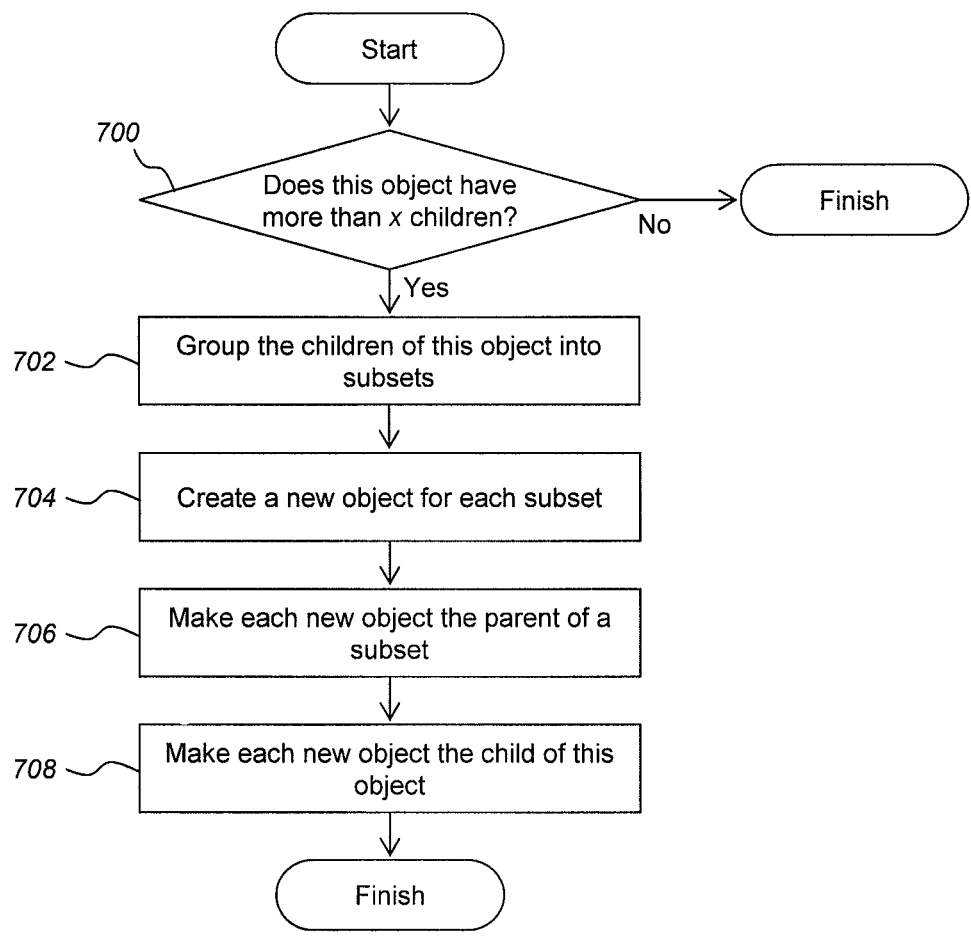
FIG. 7 illustrates steps performed by a browser of the computing device of FIG. 2, according to an embodiment of the invention.

The browser 220 may add one or more new groups of objects to the DOM tree by performing the steps illustrated in FIG. 7 on each object in the DOM tree. The browser 220 may first perform the steps illustrated in FIG. 7 on the root object of the DOM tree and then repeat these steps for any children of the DOM tree, as applicable.

When performing the steps of FIG. 7 on an object, the browser 220 first checks whether the number of child objects exceeds a pre-defined threshold. If the number of child objects exceeds the pre-defined threshold, the browser 220 groups at least some of the children of this object into a subset of objects. In a preferred arrangement of the invention, the browser 220 groups all the children of this object into a plurality of subsets of objects, while in other arrangements only some of the children are grouped into one or more subsets.

The number of subsets created by the browser 220 may be determined by the number of children of this object. In a first arrangement the number of subsets created by the browser 220 is equal to a pre-specified number, such as 2, 5, 10 etc, and objects are assigned thereto according to a predefined allocation algorithm, while in a second arrangement the number of subsets is determined on the basis of the number of child objects. In a particularly advantageous arrangement the number of subsets created by the browser 220 may be approximately the square root of the number of children of this object. In this way the number of objects in each subset may be selected to approximately match the number of subsets created.

In another arrangement the browser 220 groups the children of this object into subsets arbitrarily, preferably ensuring that each child object of this object appears in only one of the subsets created.

Figure 8A:
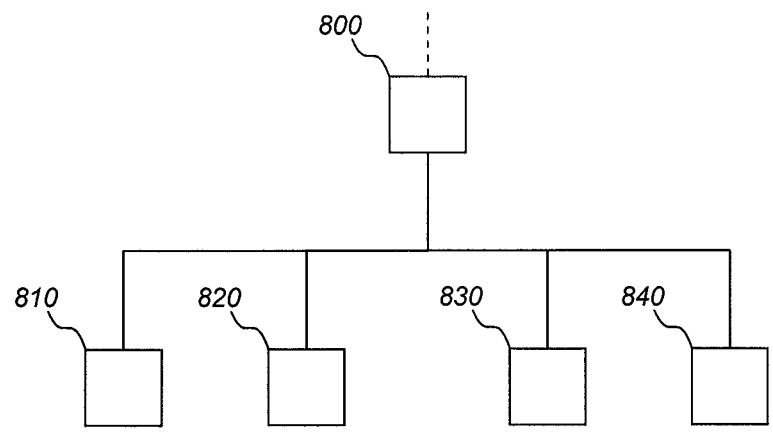
FIGS. 8a to 8d illustrate objects of a data set, according to an embodiment of the invention.

The processing of an object according to the steps of FIG. 7 will now be described with reference to FIGS. 8*a* to 8*d*. In FIG. 8*a* an exemplary portion of a DOM tree featuring object 800 is illustrated, the object 800 having children 810, 820, 830 and 840. Object 800 has a parent object and zero or more siblings, neither of which are shown.

When processing object 800 according to the steps of FIG. 7, the browser 220 first (in step 700) detects that the number of children of object 800 exceeds a pre-defined threshold, e.g. 2. The browser 220 then splits the children of object 800 into two subsets (in step 702), the first subset comprising objects 810 and 820, the second comprising objects 830 and 840.

Figure 8B:
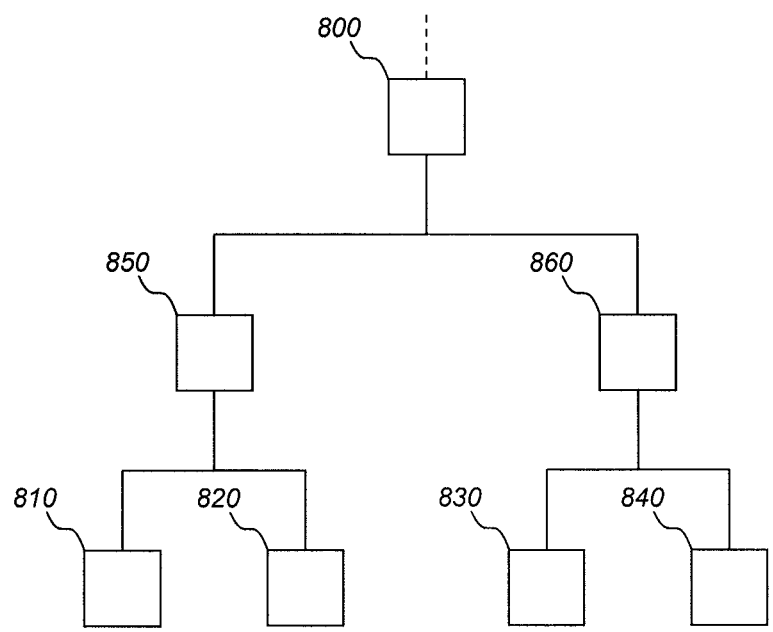

As illustrated in FIG. 8*b*, the browser 220 then creates two configuration objects 850 and 860 (step 704). The browser 220 makes configuration object 850 the parent of the objects in the first subset, i.e. objects 810 and 820, and configuration object 860 the parent of the objects in the second subset, i.e. objects 830 and 840 (step 706). The browser 220 makes object 800 the parent of configuration objects 850 and 860 (step 708).

Figure 8C:
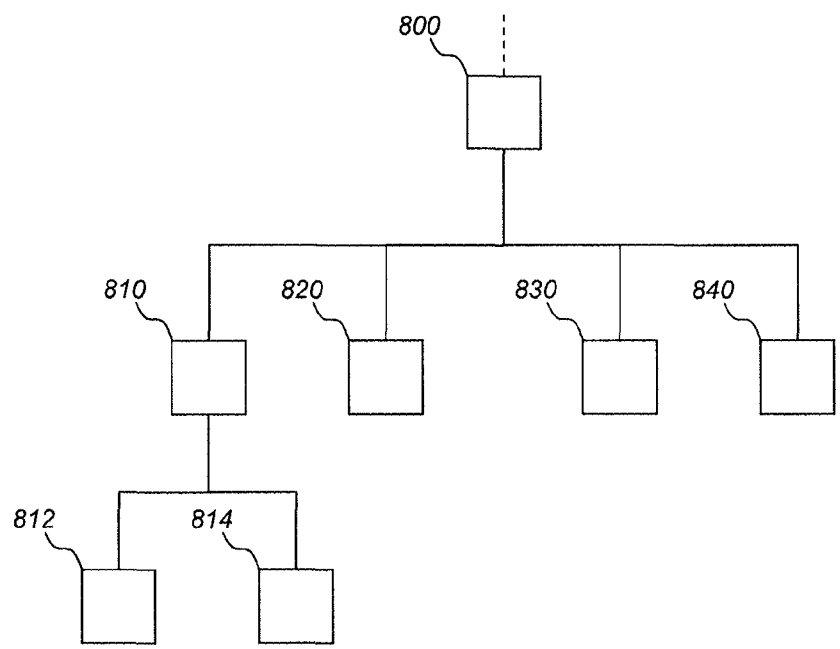
Figure 8D:
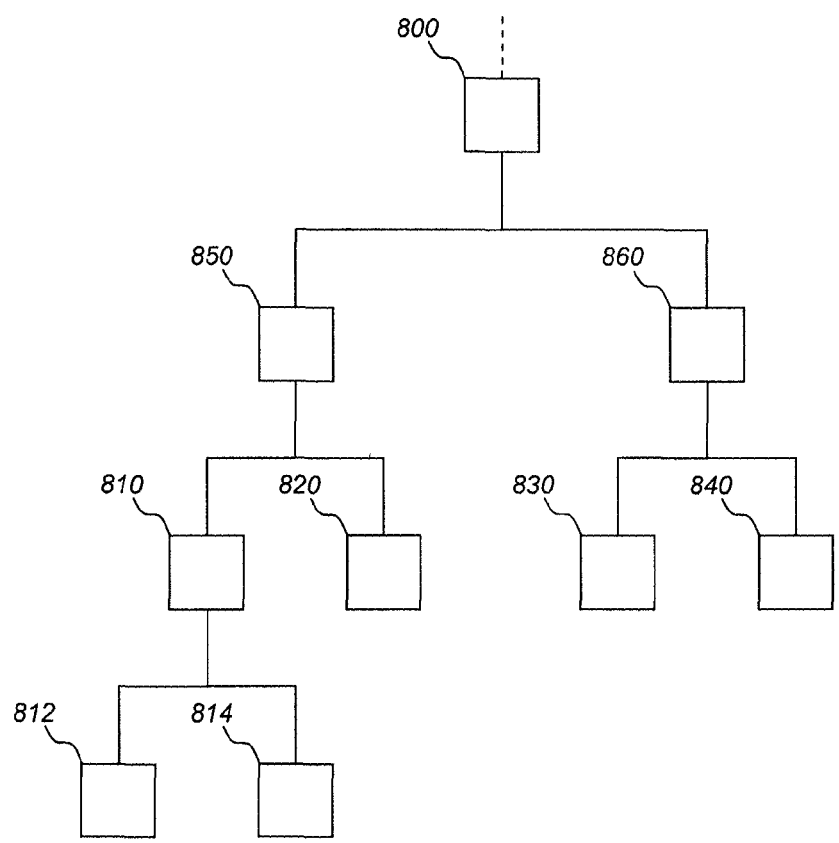

A similar example to that of FIGS. 8*a* and 8*b* is shown in FIGS. 8*c* and 8*d*. The objects in FIG. 8*c* are the same as those of FIG. 8*a*, i.e. before processing of object 800 according to the steps of FIG. 7, however in FIG. 8*c* object 810, which is one of the children of object 800, itself has two children 812 and 814. FIG. 8*d* shows that after the processing of object 800 according to the steps of FIG. 7, object 810, which is now one of the children of the configuration object 810, preserves its children 812 and 814.

As described above configuration objects added to the DOM tree (e.g. objects 850 and 860) are not rendered by the browser 220 in step 310. Specifically, the configuration objects may have style information attached to them by the browser 220 that indicates that they should not be rendered within the structured document. The configuration objects may additionally or alternatively be in the form of anonymous block-level elements and/or anonymous inline-level elements as defined in the CSS 2.1 Specification.

Although the browser 220 may not render configuration objects added in accordance with the steps of FIG. 7, it nevertheless processes those objects as it processes any other objects, and thus in accordance with steps 304 to 320 of FIG. 3 described above.

When layout information is determined by the browser 220 in step 304, the size and position of each configuration object is set such that, by default, the region occupied by a configuration object matches the region occupied by its children. As a result, when group layout information is determined by the browser 220 in step 306, each configuration object will be marked as having the pre-defined spatial relationship in the group layout information.

The region occupied by the children of a configuration object therefore determines whether the configuration object occupies a region within the region occupied by the parent of the configuration object. This may be determined by whether the parent (e.g. 800) has the pre-defined spatial relationship with its child objects, which is determined by the browser 220 for all objects in the DOM tree in step 306 above.

An example of how the pre-defined spatial relationship of the object 800 of FIGS. 8*a* and 8*b* is affected by the incorporation of configuration objects 850 and 860 will now be described. In FIG. 8*a*, it is assumed that the region of object 810 is not within the region of its parent object 800, whilst the region of objects 820, 830 and 840 are within the region of object 800. In step 306 the browser 220 will therefore determine that object 800 does not have the pre-defined spatial relationship with its children.

In FIG. 8*a* the browser 220 adds configuration objects 850 and 860, for which the sizes and positions of configuration object 850 and 860 are set so that they match the regions occupied by objects 810, 820 and 830, 840, respectively. As objects 820 and 830 occupy a region within that of object 800, the configuration object 860 will occupy a region within that of object 800. Due to the size and position of object 810 however, configuration object 850 will not occupy a region within that of object 800, and object 800 will therefore not have the pre-defined relationship with its children.

Thus, and as object 800 does not have the pre-defined spatial relationship with its children, when identifying objects to be rendered for display in step 308, the browser 220 will, in the example of FIG. 8*a* described above, process objects 810 to 840 to determine whether these should be marked for rendering.

In the example of FIG. 8*b* it is assumed that all of objects 810 to 840 are within the region of the parent object; the browser 220 will first process configuration objects 850 and 860 (to determine whether these should be marked for rendering) after processing object 800. If configuration objects 850 and 860 are not within the selected portion of the layout area of the structured document, and because all of the objects 810 to 840 are within object 800, the browser will not process objects 810 to 840. As a result, for the example of FIG. 8*b* the browser 220 has processed two fewer objects than was necessary for the arrangement of objects of FIG. 8*a*.

It will be appreciated that if configuration objects 850 and 860 were within the selected portion of the layout area of the structured document the browser 220 would process objects 810 to 840 as well as objects 850 and 860; thus causing the browser 220 to process two objects more than was necessary using the arrangement of objects of FIG. 8*a*.

Preferably the number of objects in a subset of a given configuration object created at step 702 is greater than two, ensuring an overall reduction in the number of objects that are processed in step 308. More specifically, in one arrangement, the number of children in a subset may be approximately the square root of the number of children from which the subset was created, as was described above. In this way only objects with larger numbers of children have those children divided into subsets, for example an object with 100 children may have those children divided into 10 subsets of 10 children.

A benefit of adding one or more new groups of objects in accordance with the steps of FIG. 7 will now be illustrated via the following example, where an original object comprising 100 children has one new group added to it, the new group comprising a subset of 10 of the original object's children and a configuration object.

If the region of the configuration object is not within a selected portion of the layout area then only the configuration object, and none of the 10 children of the configuration object, of the new group needs to be processed because, as described above, by definition configuration objects have the pre-defined spatial relationship with their respective children. However, if the region of the configuration object is within a selected portion of the layout area, both the configuration object and its 10 child objects (that form the subset) need to be processed, which means that in total 11 objects are processed in step 308.

Assuming that in both cases above the remaining 90 children of the original object also need to be processed, then when the region of the configuration object is not within a selected portion of the layout area, 91 objects need to be processed, and otherwise 101 objects need to be processed.

In contrast, prior to the addition of the new group in accordance with the steps in FIG. 7, all 100 children of the original object would always require processing in order to identify objects for rendering, if the original element required such processing.

As can be seen in the above example, the configuration object adds a slight overhead to the number of objects processed when the configuration object (and hence one or more of its children) is within the selected portion, but the configuration object provides a significant reduction in processing to the number of objects processed when the configuration object (and hence none of its children) is not within the selected portion.

A third exemplary embodiment of the invention will now be described. The third embodiment proceeds according to the first or second embodiment described above, however in the third embodiment, the DOM tree constructed in step 300 is at least partially constructed using information relating to one or more workspace data items.

Information relating to one or more workspace data items may be retrieved by at least one script embedded in and/or referenced by the content described in a mark-up language from which the DOM tree is derived. Such a script may retrieve the information relating to one or more workspace data items from non-volatile storage 206 and/or from another computing device via the communications network 230.

The workspace data items may include emails, calendar entries, tasks, contacts, music files, image files, video files, news feeds, social networking information and messages including Short Messaging Services messages, Multimedia Messaging Services messages and instant messages (IM).

The script processes the workspace data items in order to generate one or more objects in the DOM tree, each relating to a workspace data item. For example, the script may generate objects in the DOM tree that form entries in a list relating to the one or more workspace data items, such as a list of emails, calendar entries, tasks, contacts, etc. This list may allow the user to access and/or edit one or workspace data items by, for example, selecting those entries from the displayed list.

The script may alternatively or in addition be processed by the browser in step 312, which may require the browser to re-render a selected portion of the structured document and/or re-construct the DOM tree and any intermediate representations, as described in the first embodiment.

As will be appreciated from the foregoing, the present invention is particularly suited to displaying selected portions of a structured document whose DOM tree comprises a relatively large number of objects (such as for example a large list of workspace data items), and where only a relatively small number of those objects can be rendered in a selected portion within the display area at any one time.

For such a structured document the method of the first embodiment may avoid processing of the children of objects that do not require rendering and that have the pre-defined spatial relationship with their respective children (steps 308 and 310).

The method of the second embodiment may provide an additional benefit to that of the first embodiment for such a structured document by grouping a large number of children into subsets. When a subset of children does not require rendering in steps 308 and 310 the second embodiment may allow the browser 220 to process only one object for the subset, rather than the objects contained within all of the subsets.

The above embodiments are to be understood as illustrative examples of the invention. Further embodiments of the invention are envisaged as follows.

Alternative arrangements of the above described embodiments are envisaged where, once one or more intermediate representations, each comprising a hierarchy of nodes, have been constructed in step 302, later steps including steps 304 to 320, and the steps illustrated in FIGS. 5 and 7 may be performed in relation to the nodes in one or more of the intermediate representations that correspond to the objects of the DOM tree, rather than in relation to the objects of the DOM tree themselves, as has been described above. In such arrangements the browser 220 may still process scripts in relation to objects in the DOM tree in step 310, rather than in relation to nodes in an intermediate representation; however changes made to the DOM tree and/or to its objects by scripts in step 310 may be propagated by the browser 220 to the corresponding one or more intermediate representations and/or their nodes, in order to allow the browser 220 to continue performing steps 304 to 320 in relation to the nodes in one or more of the intermediate representations after any such changes are made.

In an alternative to the first embodiment of the invention the browser 220 may be configured to re-use at least part of a rendered selected portion of the structured document that has been previously rendered for display. The browser 220 may store one or more rendered selected portions of the structured document in RAM 208 once they have been rendered in step 308. If the browser 220 determines that rendering of a new selected portion of the display is required, e.g. in step 314, or that a change to the layout information and/or DOM tree has occurred in either step 318 or step 320, the browser 220 may re-use at least part of the one or more rendered selected portions when rendering the new selected portion, in order to reduce the amount or processing required. If the selected portion has been scrolled downwards, for example, the browser 202 may be configured to re-use at least part of a previously rendered selected portion that comprises objects that are also in the new selected portion.

In an alternative to the second embodiment of the invention the browser 220 may be configured to group the children of an object into subsets using a pre-defined strategy in step 702, rather than grouping the children of an object into subsets arbitrarily.

A suitable pre-defined strategy used by the browser 220 in one such arrangement may include the browser 220 grouping some of the children of an object into a subset based on the arrangement of the tags to which those child objects correspond in content described in a mark-up language. For example, the browser 220 may group some of the children of an object into a subset if they correspond to a sequence of HTML tags, such as <div> . . . </div><div> . . . </div><div> . . . </div>, etc. As there may be a higher probability that such child objects may be located within the region occupied by their parent, the browser 220 may group the child objects into a subset so that there is a higher chance that the subset is not processed when they are not within the selected portion (than there may be if the child objects were selected arbitrarily), i.e. after a new object is added for the subset in FIG. 7.

The pre-defined strategy used by the browser 220 in another arrangement may include the browser 220 grouping some of the children of an object into a subset based on the styling information attached to those child objects. For example, the browser 220 may group some of the children of an object into a subset if their styling information indicates that they should be positioned using the same positioning scheme. As there may be a higher probability that such child objects may be located within the region occupied by their parent, the browser 220 may group the child objects into a subset so that there is a higher chance that the subset is not processed when they are not within the selected portion (than there may be if the child objects were selected arbitrarily), i.e. after a new object is added for the subset in FIG. 7.

In an alternative embodiment of the invention the browser 220 may receive the content described in a mark-up language in the form of a stored DOM tree held in a data file, rather than in an HTML file. The stored DOM tree held in a data file may have been pre-derived from HTML content by a different computing device to the computing device 100, and may have been stored in the data file by that different computing device. The stored DOM tree may be represented in the data file in a format that allows the browser 220 to more efficiently construct a DOM tree (e.g. in step 300 described above) than would be possible if the browser 220 were to derive the same DOM tree from HTML content directly.

It will be appreciated that HTML is an exemplary mark-up language used to illustrate the features of the present invention, and that the invention may be used with other mark-up languages including Extensible Markup Language (XML), Extensible Hypertext Markup Language (xHTML), etc.

The invention may alternatively be used to display a data set that relates to an image. The data set may be at least partially derived from content described in a mark-up language, for example an XML-based language such as Scalable Vector Graphics (SVG). The content may include a hierarchy of tags that define the structure and characteristics of the image, such as shapes and/or objects and their positions and/or appearance within the image. Cascading Style Sheet (CSS) data referenced by or included within the content may define style information to be used in displaying the image. A DOM tree may be constructed from the XML tags that define the image (as for example is described in the SVG 1.1 Working Draft) and then used to display the image according to the steps of the present invention.

The invention may alternatively be used to display a selected portion of a data set that relates to a mathematical equation. The data set may be at least partially derived from content described in a mark-up language, for example an XML-based language such as Mathematical Markup Language (MathML). The content may include a hierarchy of tags that define the structure and characteristics of the mathematical equation. Cascading Style Sheet (CSS) data referenced by or included within the content may define style information to be used in displaying the image. A DOM tree may be constructed from the XML tags that define the mathematical equation (as for example is described in the MathML 3.0 Proposed Recommendation) and then used to display a selected portion of the mathematical equation according to the steps of the present invention.

It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

The invention claimed is:

1. A method for displaying a selected portion of a data set within a display area of a display device, the data set comprising an element group, the element group including a higher-level element and one or more lower-level elements, the method comprising:
   processing layout information for the higher-level element to identify that a region occupied by the higher-level element does not correspond with a selected portion of the layout area of the data set;
   based on the identification, determining not to render the higher-level element for display within the display area;
   determining whether the higher-level element has a predefined spatial relationship with a first lower-level element of the one or more lower-level elements, the predefined spatial relationship indicating that the region occupied by the first lower-level element falls within the region occupied by the higher-level element of the element group;
   selecting, on the basis of the determination, whether or not to perform a first process, the first process being selected when it is determined that the higher-level element does not have the predefined spatial relationship with the first lower-level element, wherein:
   the first process comprises processing layout information for the first lower-level element to identify whether or not the region occupied by the first lower-level element corresponds with the selected portion of the data set, and, when it is identified that the region occupied by the first lower-level element corresponds with the selected portion of the data set, selecting to render the first lower-level element for display in the display area; and
   when it is determined that the higher-level element has the predefined spatial relationship with the first lower-level element, selecting not to render the first lower-level element for display in the display area.

2. The method according to claim 1,
wherein the element group comprises a plurality of lower-level elements, at least one of the lower-level elements being at a first lower-level and at least one of the lower-level elements being at a second lower-level, and
wherein the predefined spatial relationship indicates that a region occupied by the lower-level elements at both the first lower-level and the second lower-level in the group falls within a region occupied by the higher-level element in the group.

3. The method according to claim 1, wherein the data set comprises a plurality of lower levels for a group including a first lower-level and a second lower-level, further comprising: processing the elements in groups including:
a first group comprising one or more lower-level elements at the first lower-level and one or more lower-level elements at the second lower-level; and
one or more lower-level groups comprising elements from the first group, a lower-level group excluding the higher-level element and including an element at the first lower-level and one or more elements at the second lower-level,
the processing of the plurality of elements in groups comprising:
processing the first group differently in dependence on whether a region occupied by the higher-level element of the group has a predefined spatial relationship with respect to a region occupied by the lower-level elements in the group; and
if the region occupied by the higher-level element of the first group does not have the predefined spatial relationship with respect to the region occupied by the lower-level elements in the first group, processing the one or more lower-level groups of elements differently in dependence on whether a region occupied by the first lower-level element of a first lower-level group has a predefined spatial relationship with respect to a region occupied by the one or more second lower-level elements in the lower-level group.

4. The method according to claim 1, wherein the selected portion of the layout area of the data set is only part of the layout area of the data set, due to a limitation in size of the display area of the display device.

5. The method according to claim 1, wherein the selected portion of the layout area of the data set, when rendered for display, is equal in size to the display area of the display device.

6. The method according to claim 1, further comprising: generating group layout information for inclusion in layout information used to identify one or more elements of the element group to be rendered for display in the display area.

7. The method according to claim 6, further comprising: reprocessing the data set in response to a change made to the element group.

8. The method according to claim 7, wherein the data set comprises scripting data, and wherein the reprocessing the data set is in response to a change made to the element group during execution of the scripting data.

9. The method according to claim 7, wherein the change made to the element group includes at least one of: adding a new element to the element group or removal of an existing element from the element group.

10. The method according to claim 7, wherein the change made to the element group includes a change in the layout information for at least an existing element from the element group.

11. The method according to claim 6, further comprising:
storing the group layout information;
processing the stored group layout information to identify one or more elements of the element group to be rendered for display in the display area when the selected portion of the layout area of the data set covers a first part of the layout area of the data set; and
re-processing the stored group layout information, to identify one or more elements to be rendered for display in the display area when the selected portion of the layout area of the data set covers a second, different part of the layout area of the data set.

12. The method according to claim 11, wherein the re-processing of the group layout information is performed in response to user input to change a displayed part of the layout area of the data set.

13. The method according to claim 6, further comprising:
storing the group layout information;
processing the stored group layout information to identify one or more elements to be rendered for display in the display area, and rendering the identified elements when the one or more elements are to be rendered in a first display state; and
re-processing the stored group layout information to identify one or more elements to be rendered for display in the display area, and rendering the identified elements, when the one or more elements are to be rendered in a second, different, display state.

14. The method according to claim 6, further comprising:
storing the group layout information after the processing;
processing the stored group layout information to identify one or more elements to be rendered for display in the display area;
storing selection data identifying the identified elements and rendering the identified elements, when the one or more elements are to be rendered in a first display state; and
re-rendering the identified elements based on the stored selection data when the one or more elements are to be rendered in a second, different, display state.

15. The method according to claim 1, wherein the layout information includes the size and position of the higher-level element and one or more lower-level elements in the element group within a layout area of the data set.

16. The method according to claim 1, wherein the data set relates to a set of workspace data items, the data set including a hierarchy of data, the hierarchy of data defining grouping information associated with the workspace data items.

17. The method according to claim 16, wherein the set of workspace data items comprises one or more emails.

18. The method according to claim 16, wherein the set of workspace data items comprises one or more calendar entries.

19. The method according to claim 16, wherein the set of workspace data items comprises one or more contacts.

20. The method according to claim 1, wherein the data set comprises a mark-up document, the mark-up document including a hierarchy of data, the hierarchy of data defining grouping information received in the mark-up document.

21. The method according to claim 1, further comprising: defining at least one new element group, resulting in modification of the grouping information associated with the data set.

22. The method according to claim 1, wherein the layout information is at least partly derived from grouping information associated with the group of elements.

23. A computer device arranged to display a selected portion of a data set within a display area of a display device, the data set comprising an element group, the element group including a higher-level element and one or more lower-level elements, the computer device comprising at least one processor and at least one memory, the at least one memory storing executable instructions, the at least one processor being configured to execute the executable instructions and cause the computer device to:
 process layout information for the higher-level element to identify that a region occupied by the higher-level element does not correspond with a selected portion of the layout area of the data set;
 based on the identification, determine not to render the higher-level element for display within the display area;
 determine whether the higher-level element has a predefined spatial relationship with a first lower-level element of the one or more lower-level elements, the predefined spatial relationship indicating that the region occupied by the first lower-level element falls within the region occupied by the high-level element of the element group; and
 select, on the basis of the determination, whether or not to perform a first process, the first process being selected when it is determined that the higher-level element does not have the predefined spatial relationship with the lower-level element, wherein:
  the first process comprises processing layout information for the first lower-level element to identify whether or not the region occupied by the first lower-level element corresponds with the selected portion of the data set, and, when it is identified that the region occupied by the first lower-level element corresponds with the selected portion of the data set, selecting to render the first lower-level element for display in the display area; and
  when it is determined that the higher-level element has the predefined spatial relationship with the first lower-level element, selecting not to render the first lower-level element for display in the display area.

24. A computer program product comprising a non-transitory computer-readable storage medium having computer readable instructions stored thereon, the computer-readable instructions being executable by a computerized device to cause the computerized device to perform a method for displaying a selected portion of a data set within a display area of a display device, the data set comprising an element group, each of the element group including a higher-level element and one or more lower-level elements, the method comprising:
 processing layout information for the higher-level element to identify that a region occupied by the higher-level element does not correspond with a selected portion of the layout area of the data set;
 based on the identification, determining not to render the higher-level element for display within the display area;
 determining whether the higher-level element has a predefined spatial relationship with a first lower-level element of the one or more lower-level elements, the predefined spatial relationship indicating that the region occupied by the first lower-level element falls within the region occupied by the higher-level element of the element group;
 selecting, on the basis of the determination, whether or not to perform a first process, the first process being selected when it is determined that the higher-level element does not have the predefined spatial relationship with the first lower-level element, wherein:
  the first process comprises processing layout information for the first lower-level element to identify whether or not the region occupied by the first lower-level element corresponds with the selected portion of the data set, and, when it is identified that the region occupied by the first lower-level element corresponds with the selected portion of the data set, selecting to render the first lower-level element for display in the display area; and
  when it is determined that the higher-level element has the predefined spatial relationship with the first lower-level element, selecting not to render the first lower-level element for display in the display area.

* * * * *